(12) United States Patent
Kusada et al.

(10) Patent No.: US 11,345,252 B2
(45) Date of Patent: May 31, 2022

(54) VEHICLE INCLUDING A HYBRID ELECTRIC CONTROL UNIT

(71) Applicant: TOYOTA JIDOSHA KABUSHIKI KAISHA, Toyota (JP)

(72) Inventors: Masaki Kusada, Toyota (JP); Tomoko Oba, Toyota (JP); Yusuke Mamada, Toyota (JP); Abhilasha Sumangal Devaraj, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 16/773,311

(22) Filed: Jan. 27, 2020

(65) Prior Publication Data
US 2020/0238849 A1 Jul. 30, 2020

(30) Foreign Application Priority Data
Jan. 28, 2019 (JP) .............................. JP2019-012034

(51) Int. Cl.
*B60L 55/00* (2019.01)
*B60W 20/00* (2016.01)
(Continued)

(52) U.S. Cl.
CPC ............... *B60L 55/00* (2019.02); *B60L 1/006* (2013.01); *B60L 50/61* (2019.02); *B60L 58/12* (2019.02);
(Continued)

(58) Field of Classification Search
CPC ...... B60W 20/00; B60W 20/13; B60W 50/14; B60W 2555/20; B60L 53/60; B60L 55/00; B60L 58/12; Y02T 90/14; H02J 2310/48
See application file for complete search history.

(56) References Cited

U.S. PATENT DOCUMENTS 6,104,160 A * 8/2000 Iwata ..................... B60L 53/18
320/103
10,807,591 B1 * 10/2020 Kentley-Klay ....... B60W 10/20
(Continued)

FOREIGN PATENT DOCUMENTS

JP 2006003173 A * 1/2006
JP 2007252117 A * 9/2007 ............ B60L 53/305
(Continued)

OTHER PUBLICATIONS

Google machine translation of WO 2013/154093 (original WO document published Oct. 17, 2013) (Year: 2013).*
(Continued)

*Primary Examiner* — David A Testardi
(74) *Attorney, Agent, or Firm* — Sughrue Mion, PLLC (57) ABSTRACT

An object is to enable a vehicle to be sufficiently used as a power source when the vehicle is located in an area where a disaster occurs. There is provided a vehicle including a driving system configured to generate electric power by using a fuel and to output power for driving; a power storage device configured to transmit electric power to and from the driving system; a power feeding device configured to supply generated power that is generated by the driving system and/or electric power from the power storage device, to an external device; and a control device configured to control the driving system and the power feeding device. When the vehicle is located in the area where the disaster occurs, the control device performs a recommendation process to recommend that a user sets a charge priority mode, which gives priority to charging of the power storage device over driving.

4 Claims, 4 Drawing Sheets

(51) Int. Cl.
*B60W 50/14* (2020.01)
*B60L 50/61* (2019.01)
*B60L 58/12* (2019.01)
*B60L 1/00* (2006.01)
B60K 6/46 (2007.10)
B60L 50/70 (2019.01)

(52) U.S. Cl.
CPC ............ *B60W 20/00* (2013.01); *B60W 50/14* (2013.01); *B60K 6/46* (2013.01); *B60L 50/70* (2019.02); *B60L 2210/40* (2013.01); *B60W 2050/146* (2013.01); *B60W 2555/20* (2020.02); *B60Y 2200/92* (2013.01); *B60Y 2300/91* (2013.01)

(56) References Cited

U.S. PATENT DOCUMENTS

| | | | | |
|---|---|---|---|---|
| 2011/0204720 A1* | 8/2011 | Ruiz | ........................ | B60L 53/14 307/66 |
| 2012/0086397 A1* | 4/2012 | Obayashi | ................. | B60L 53/14 320/109 |
| 2012/0187900 A1* | 7/2012 | Murawaka | .............. | B60L 53/63 320/106 |
| 2012/0193983 A1* | 8/2012 | Yukizane | ................. | H02J 9/061 307/9.1 |
| 2013/0332016 A1* | 12/2013 | Suzuki | ................... | F02N 11/084 701/22 |
| 2014/0114512 A1* | 4/2014 | Treharne | ............... | B60W 20/10 701/22 |
| 2014/0114514 A1* | 4/2014 | Crombez | .............. | B60W 20/13 701/22 |
| 2014/0183942 A1* | 7/2014 | Sugiyama | ............. | B60L 15/007 307/10.1 |
| 2014/0232182 A1* | 8/2014 | Kinomura | ............... | B60L 53/16 307/10.1 |
| 2015/0266470 A1* | 9/2015 | Takara | .................... | B60L 55/00 701/22 |
| 2016/0031430 A1* | 2/2016 | Aoki | ......................... | F01N 9/00 701/22 |
| 2016/0178678 A1* | 6/2016 | Pelletier | .................. | H02J 3/386 705/39 |
| 2016/0185241 A1* | 6/2016 | Kinomura | ................. | B60L 3/00 307/10.1 |
| 2017/0028866 A1* | 2/2017 | Miller | ................... | B60W 20/12 |
| 2017/0129475 A1* | 5/2017 | Prakah-Asante | ... | B60W 50/082 |
| 2019/0369623 A1* | 12/2019 | Sadakiyo | ............ | G05D 1/0214 |

FOREIGN PATENT DOCUMENTS

| | | | | | |
|---|---|---|---|---|---|
| JP | 2009001123 | A | * | 1/2009 | |
| JP | 2009148069 | A | * | 7/2009 | |
| JP | 2009148070 | A | * | 7/2009 | |
| JP | 2012005333 | A | * | 1/2012 | |
| JP | 2012-135153 | A | | 7/2012 | |
| JP | 2012252683 | A | * | 12/2012 | |
| JP | 2013009488 | A | * | 1/2013 | |
| JP | 2013091377 | A | * | 5/2013 | |
| JP | 2013158218 | A | * | 8/2013 | ............ B60L 53/305 |
| JP | 2014171311 | A | * | 9/2014 | |
| JP | 2015160540 | A | * | 9/2015 | |
| JP | 2016004026 | A | * | 1/2016 | |
| JP | 2017-073915 | A | | 4/2017 | |
| WO | WO-2013154093 | A1 | * | 10/2013 | ............ B60L 53/63 |

OTHER PUBLICATIONS

EPO machine translation of JP 2015-160540 (original JP document published Sep. 7, 2015) (Year: 2015).*

* cited by examiner

VEHICLE INCLUDING A HYBRID ELECTRIC CONTROL UNIT

The present disclosure claims priority to Japanese Patent Application No. 2019-012034 filed Jan. 28, 2019, which is incorporated herein by reference in its entirety including specification, drawings and claims.

TECHNICAL FIELD

The present disclosure relates to a vehicle.

BACKGROUND

A proposed configuration of a vehicle includes a power storage device and a discharge device configured to supply electric power from the power storage device to outside of the vehicle, such as a V2H (Vehicle to Home) stand (as described in, for example, JP 2017-73915A). When the vehicle is located in a specified area where a disaster occurs, this vehicle is configured to control the discharge device such as to allow for operation of the power storage device up to a lower SOC (state of charge) level than a lower limit of the SOC of the power storage device that is set when the vehicle is not located in the area where the disaster occurs. This configuration enables a larger amount of electric power to be supplied to outside of the vehicle in the case of a disaster.

SUMMARY

When the vehicle is located in the area where the disaster occurs, under a certain condition of the SOC of the power storage device, however, the vehicle of the above configuration may allow electric power to be supplied from the power storage device to outside of the vehicle (external device) for only a short time period (for example, the SOC in an ordinary time is controlled to approximately a half level of a full charge level, in order to save a capacity for regenerative energy generated during deceleration of the vehicle. This vehicle may thus fail to be sufficiently used as a power source.

A main object of the present disclosure is to enable a vehicle to be sufficiently used as a power source when the vehicle is located in an area where a disaster occurs.

In order to achieve the above primary object, the vehicle of the present disclosure employs the following configuration.

The present disclosure is directed to a vehicle. The vehicle includes a driving system configured to generate electric power by using a fuel and to output power for driving, a power storage device configured to transmit electric power to and from the driving system, a power feeding device configured to supply generated power that is generated by the driving system and/or electric power from the power storage device, to an external device and a control device configured to control the driving system and the power feeding device. When the vehicle is located in an area where a disaster occurs, the control device performs a recommendation process to recommend that a user sets a charge priority mode, which gives priority to charging of the power storage device over driving.

When the vehicle is located in the area where the disaster occurs, the vehicle according to this aspect of the present disclosure performs the recommendation process to recommend that the user sets the charge priority mode, which gives priority to charging of the power storage device over driving. The expression of "giving priority to charging of the power storage device over driving" herein means that priority is given to using a fuel (energy) to increase the state of charge of the power storage device over using the fuel to extend the drivable distance. More specifically, the driving system is controlled to provide the higher state of charge of the power storage device in the state of setting the charge priority mode than the state of charge provided in the state of not setting the charge priority mode. When the user sets the charge priority mode as a result of such control, the power storage device is quickly charged with electric power generated by the driving system and ensures a sufficient amount of electric power that is to be supplied to the external device. As a result, this configuration enables the vehicle to be sufficiently used as a power source for supplying the electric power to the external device.

DESCRIPTION OF EMBODIMENTS

The following describes some aspects of the disclosure with reference to embodiments.

Figure 1:
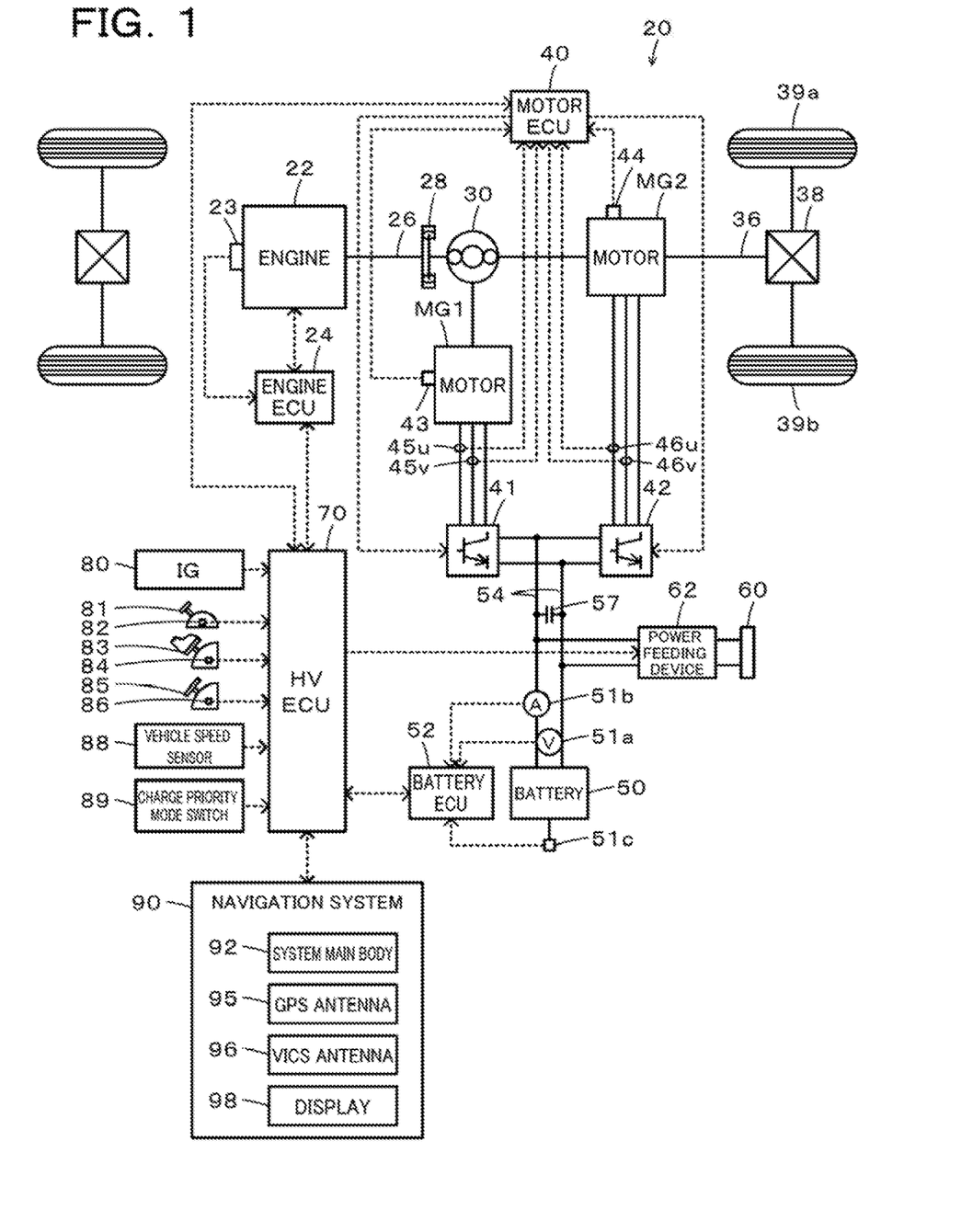
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a battery 50 serving as a power storage device, a connector unit 60, a power feeding device 62, a navigation system 90, and a hybrid electronic control unit (hereinafter referred to as "HVECU") 70.

The engine 22 is configured as an internal combustion engine that outputs power using, for example, gasoline or light oil as a fuel and has a crankshaft 26 that is connected with a carrier of the planetary gear 30 via a damper 28. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect a rotational position of the crankshaft 26 of the engine 22, are input into the engine ECU 24 via the input port. Various control signals for operation control of the engine 22 are output from the engine ECU 24 via the output port. The engine ECU 24 is connected with the HVECU 70 via respective communication ports. The engine ECU 24 calculates a rotation speed Ne of the engine 22, based on the crank angle $\theta cr$ input from a crank position sensor 23.

The planetary gear 30 is configured as a single pinion-type planetary gear mechanism and includes a sun gear, a ring gear, a plurality of pinion gears respectively engaging with the sun gear and the ring gear and a carrier provided to support the plurality of pinion gears to be rotatable and revolvable. The sun gear of the planetary gear 30 is connected with a rotor of the motor MG1. The ring gear of the planetary gear 30 is connected with a driveshaft 36 that is linked with drive wheels 39a and 39b via a differential gear 38. The carrier of the planetary gear 30 is connected with the crankshaft 26 of the engine 22 via the damper 28 as described above. In other words, the motor MG1, the engine 22 and the driveshaft 36 are respectively connected with the sun gear, the carrier and the ring gear serving as three rotational elements of the planetary gear 30, such as to be arranged in this sequence in an alignment chart.

The motor MG1 is configured, for example, as a synchronous generator motor and has the rotor that is connected with the sun gear of the planetary gear 30. The motor MG2 is configured, for example, as a synchronous generator motor and has a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports and a communication port, in addition to the CPU, although not being illustrated. Signals from various sensors required for drive control of the motors MG1 and MG2, for example, rotational positions em1 and em2 from rotational position detection sensors 43 and 44 configured to detect the rotational positions of the respective rotors of the motors MG1 and MG2 and phase currents Iu1, Iv1, Iu2 and Iv2 from current sensors 45u, 45v, 46u and 46v configured to detect electric currents flowing in the respective phases of the motors MG1 and MG2, are input into the motor ECU 40 via the input port. The motor ECU 40 outputs via the output port, for example, switching control signals to the plurality of switching elements included in the respective inverters 41 and 42. The motor ECU 40 is connected with the HVECU 70 via the respective communication ports. The motor ECU 40 calculates electrical angles $\theta e1$ and $\theta e1$, angular velocities $\omega m1$ and $\omega m2$ and rotation speeds Nm1 and Nm2 of the respective motors MG1 and MG2, based on the rotational positions $\theta m1$ and $\theta m2$ of the respective rotors of the motors MG1 and MG2 input from the rotational position detection sensors 43 and 44.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the amount of electric power dischargeable from the battery 50 to the total capacity of the battery 50.

The connector unit 60 is configured to be connectable with a connector unit of an external device, (a device that is not a component of the vehicle, for example, an electrical appliance or a V2H device). The power feeding device 62 is configured to convert generated power, which is generated by the motor MG1 using the power from the engine 22, or electric power from the battery 50 (DC power) into AC power of a predetermined voltage (for example, 100 V) and supply the AC power to the external device when the connector unit 60 is connected with the connector unit of the external device.

The navigation system 90 includes a system main body 92, a GPS antenna 95, a VICS (registered trademark) antenna 96 and a display 98. The system main body 92 includes a CPU, a ROM, a RAM, a storage medium, input and output ports and a communication port, although not being specifically illustrated. For example, map information is stored in the storage medium of the system main body 92. The map information includes, for example, service information (for example, sightseeing information and parking places) and road information of respective drive sections (for example, between traffic lights and between intersections) stored in the form of a database. The road information includes, for example, distance information, road width information, number of lane information, district information (for example, an urban district or a suburban district), road type information (for example, a local street or an express way), road grade information, a legal speed limit, and the number of traffic lights. The GPS antenna 95 is configured to receive information with regard to a current location of the vehicle. The VICS (registered trademark) antenna 96 is configured to receive traffic congestion information, traffic control information, disaster information and the like from information centers. The display 98 is configured as a touch panel display to display various pieces of information, for example, information with regard to the current location of the vehicle and a scheduled drive route to a destination, and to allow the user to enter various instructions. The navigation system 90 is connected with the HVECU 70 via the respective communication ports.

When the user operates the display 98 to set a destination, the system main body 92 of this navigation system 90 serves to set a scheduled drive route from the current location of the vehicle to the destination, based on the map information stored in the storage medium of the system main body 92, the current location of the vehicle received by the GPS antenna 95, and the user's set destination, to display the set scheduled drive route on the display 98, and to start route guidance.

The HVECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The input signals further include a switch signal from a charge priority mode switch 89 provided to allow the user to set a charge priority mode, which gives priority to charging of the battery 50 over driving. The HVECU 70 outputs, for example, a control signal to the power feeding device 62 via the output port. The HVECU 70 is connected with the engine ECU 24, the motor ECU 40, the battery ECU 52 and the navigation system 90 via the respective communication ports as described above.

The hybrid vehicle 20 of the embodiment having the configuration described above performs hybrid drive (HV drive) to be driven with operation of the engine 22 or performs electric drive (EV drive) to be driven without operation of the engine 22.

According to a basic procedure in the HV drive, the HVECU 70 first sets a driving torque $Td^*$ that is required for driving (that is required for the driveshaft 36), based on the accelerator position Acc and the vehicle speed V, and calculates a driving power $Pd^*$ that is required for driving by multiplying the set driving torque $Td^*$ by a rotation speed Nd of the driveshaft 36 (i.e., the rotation speed Nm2 of the motor MG2). The HVECU 70 subsequently calculates a target power $Pe^*$ of the engine 22 by subtracting a charge discharge required power $Pb^*$ (that takes a positive value in the state that the battery 50 is discharged) based on the state of charge SOC of the battery 50 from the driving power $Pd^*$, and sets a target rotation speed $Ne^*$ and a target torque $Te^*$ of the engine 22 and torque commands $Tm1^*$ and $Tm2^*$ of the motors MG1 and MG2 such that the calculated target power $Pe^*$ is output from the engine 22 and that the driving torque $Td^*$ is output to the driveshaft 36. The HVECU 70 then sends the target rotation speed $Ne^*$ and the target torque $Te^*$ of the engine 22 to the engine ECU 24, while sending the torque commands $Tm1^*$ and $Tm2^*$ of the motors MG1 and MG2 to the motor ECU 40. When receiving the target rotation speed $Ne^*$ and the target torque $Te^*$ of the engine 22, the engine ECU 24 performs operation control of the engine 22 (for example, intake air flow control, fuel injection control and ignition control), such that the engine 22 is operated with the target rotation speed $Ne^*$ and the target torque $Te^*$. When receiving the torque commands $Tm1^*$ and $Tm2^*$ of the motors MG1 and MG2, the motor ECU 40 performs switching control of the plurality of switching elements included in the inverters 41 and 42, such that the motors MG1 and MG2 are driven with the torque commands $Tm1^*$ and $Tm2^*$.

According to a basic procedure in the EV drive, the HVECU 70 sets the driving torque $Td^*$ based on the accelerator position Acc and the vehicle speed V, sets a value 0 to the torque command $Tm1^*$ of the motor MG1, sets the torque command $Tm2^*$ of the motor MG2 such that the driving torque $Td^*$ is output to the driveshaft 36, and sends the torque commands $Tm1^*$ and $Tm2^*$ of the motors MG1 and MG2 to the motor ECU 40. The motor ECU 40 controls the inverters 41 and 42 as described above.

Figure 2:
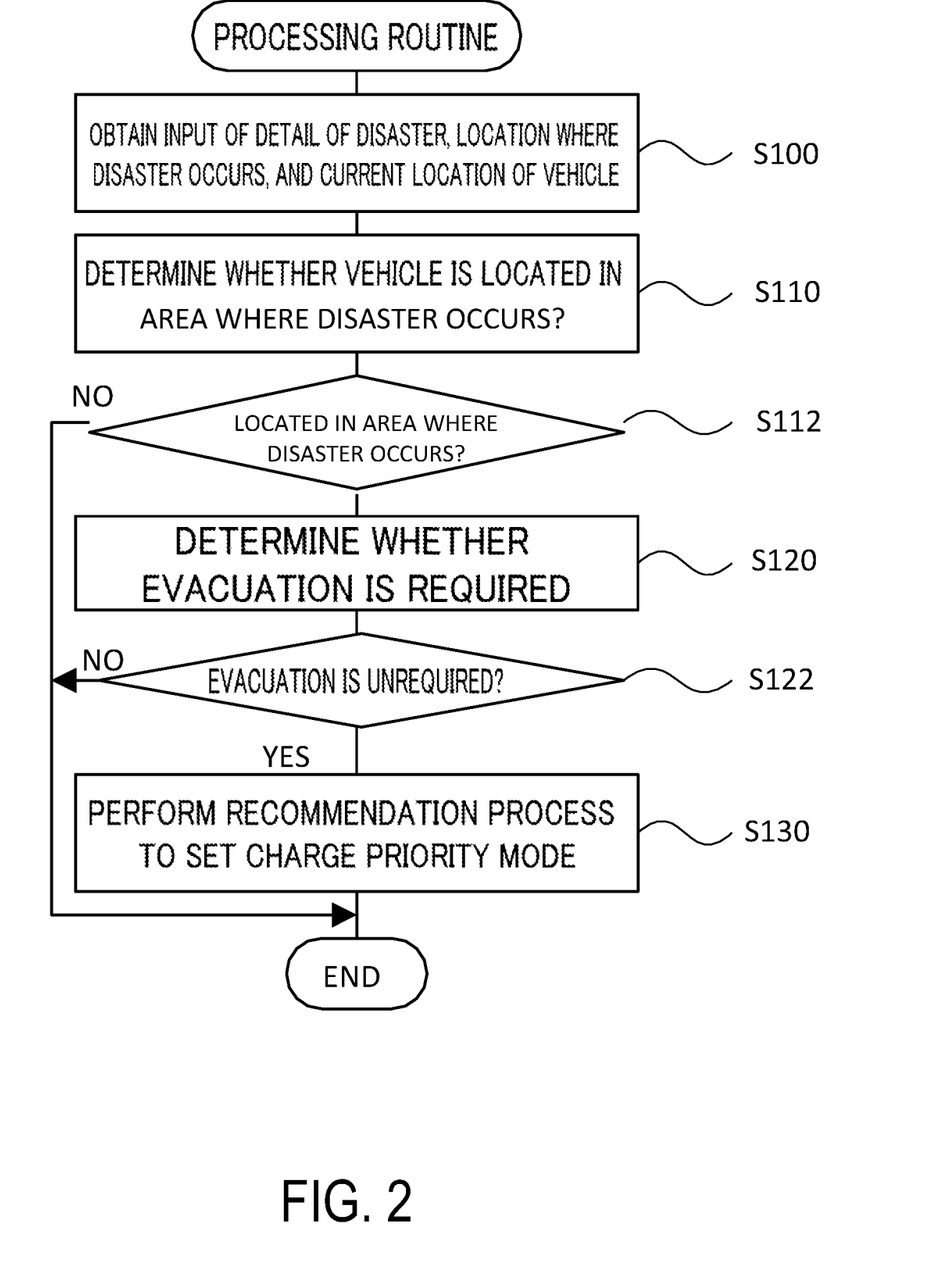
FIG. 2 is a diagram illustrating one example of a processing routine performed by the HVECU.

The following describes the operations of the hybrid vehicle 20 of the embodiment having the configuration described above or more specifically a series of operations when the VICS (registered trademark) antenna 96 receives disaster information. FIG. 2 is a diagram illustrating one example of a processing routine performed by the HVECU 70. This routine is performed when the VICS (registered trademark) antenna 96 receives disaster information.

When the processing routine of FIG. 2 is triggered, the HVECU 70 first obtains the input of data, for example, the detail of a disaster, the location where the disaster occurs, and the current location of the vehicle (step S100). The detail of the disaster and the location where the disaster occurs are data received by the VICS (registered trademark) antenna 96 and input from the navigation system 90 by communication. The detail of the disaster may be, for example, an earthquake or a tsunami (seismic sea wave). The current location of the vehicle is information received by the GPS antenna 95 and input from the navigation system 90 by communication. The current location of the vehicle includes information on the position (coordinates) and the altitude.

After obtaining the input data, the HVECU 70 determines whether the vehicle is located in an area where the disaster occurs, based on the location where the disaster occurs and the current location of the vehicle (steps S110 and S112). A procedure employable for such determination may, for example, compare a distance L between the location where the disaster occurs and the current location of the vehicle with a reference value Lref1. When it is determined that the vehicle is not located in the area where the disaster occurs, the HVECU 70 terminates this processing routine.

When it is determined at steps S110 and S112 that the vehicle is located in the area where the disaster occurs, on the other hand, the HVECU 70 determines whether an evacuation is required, based on the detail of the disaster, the location where the disaster occurs and the current location (the position and the altitude) of the vehicle (steps S120 and S122). For example, a procedure described below may be employed for such determination. When the detail of the disaster is tsunami and an altitude H of the current location of the vehicle is lower than a reference value Href, the HVECU 70 determines that an evacuation is required. When the detail of the disaster is tsunami, the altitude H of the current location of the vehicle is equal to or higher than the reference value Href, and the distance L between the location where the disaster occurs and the current location of the vehicle is shorter than a reference value Lref2, which is shorter than the reference value Lref1 described above, the HVECU 70 determines that an evacuation is required. When the detail of the disaster is tsunami, the altitude H of the current location of the vehicle is equal to or higher than the reference value Href, and the distance L between the location where the disaster occurs and the current location of the vehicle is equal to or longer than the reference value Lref2, on the other hand, the HVECU 70 determines that an evacuation is unrequired. When the detail of the disaster is an earthquake, the HVECU 70 determines that an evacuation is unrequired. The determination of whether an evacuation is required is, however, not limited to this procedure, but any other suitable procedure may be employed for such determination.

When it is determined at steps S120 and S122 that an evacuation is unrequired, the HVECU 70 performs a recommendation process to recommend that the user sets the charge priority mode (step S130) and then terminates this processing routine. For example, the recommendation process may display a message like "Turn on Charge Priority Mode switch to use the vehicle as a power source" on the display 98 of the navigation system 90. The user may visually check the display 98 and determine whether the charge priority mode is to be set. When the user turns on the charge priority mode switch 89, the HVECU 70 sets the charge priority mode. In the charge priority mode, for example, cooperative control of the HVECU 70 with the engine ECU 24 and the motor ECU 40 controls the engine 22 and the motor MG1, such that the battery 50 is charged with electric power generated by the motor MG1 using the power from the engine 22 irrespective of whether the vehicle is running or at stop, so as to provide the higher state of charge SOC of the battery 50 than the state of charge SOC in the mode other than the charge priority mode. This configuration quickly charges the battery 50 and ensures a sufficient amount of electric power that is suppliable to the external device (for example, the electric appliance or the V2H device). As a result, this configuration enables the vehicle to be sufficiently used as the power source for supplying the electric power to the external device.

When it is determined at steps S120 and S122 that an evacuation is required, on the other hand, the HVECU 70 terminates this processing routine without performing the recommendation process described above. This suppresses the user from turning on the charge priority mode switch 89 and suppresses the HVECU 70 from setting the charge priority mode. As a result, this configuration suppresses the drivable distance from being shortened by setting the charge priority mode.

As described above, the hybrid vehicle 20 of the embodiment performs the recommendation process to recommend that the user sets the charge priority mode when the vehicle is located in the area where the disaster occurs but it is determined that an evacuation is unrequired. When the user turns on the charge priority mode switch 89, the hybrid vehicle 20 of the embodiment sets the charge priority mode and controls the engine 22 and the motor MG1, such as to provide the higher state of charge SOC of the battery 50 than the state of charge SOC in the mode other than the charge priority mode. The hybrid vehicle 20 of this configuration quickly charges the battery 50 and ensures a sufficient amount of electric power that is suppliable to the external device. As a result, this configuration enables the vehicle to be sufficiently used as the power source for supplying the electric power to the external device. When it is determined that an evacuation is required, on the other hand, the hybrid vehicle 20 of the embodiment does not perform the recommendation process. This suppresses the user from turning on the charge priority mode switch 89 and suppresses the hybrid vehicle 20 from setting the charge priority mode. As a result, this configuration suppresses the drivable distance from being shortened by setting the charge priority mode.

The hybrid vehicle 20 of the embodiment performs the recommendation process to recommend that the user sets the charge priority mode when the vehicle is located in the area where the disaster occurs but it is determined that an evacuation is unrequired, while not performing the recommendation process when it is determined an evacuation is required. A modification may perform the recommendation process irrespective of the requirement or non-requirement for an evacuation when the vehicle is located in the area where the disaster occurs.

The hybrid vehicle 20 of the embodiment determines whether an evacuation is required, based on the detail of the disaster, the location where the disaster occurs, and the current location (the position and the altitude) of the vehicle. A modification may determine whether an evacuation is required, based on any one of the detail of the disaster, the location where the disaster occurs, and the current location of the vehicle.

In the hybrid vehicle 20 of the embodiment, the recommendation process displays the message to recommend that the user sets the charge priority mode, on the display 98 of the navigation system 90. In addition to or in place of such display, the recommendation process may provide an audio output of this message from a speaker (not shown) or may blink the charge priority mode switch 89.

The hybrid vehicle 20 of the embodiment uses the battery 50 as the power storage device. The battery 50 may, however, be replaced with a capacitor.

The hybrid vehicle 20 of the embodiment is configured to include the engine ECU 24, the motor ECU 40, the battery ECU 52 and the HVECU 70. According to a modification, however, at least two of these ECUs may be configured as one single electronic control unit.

Figure 3:
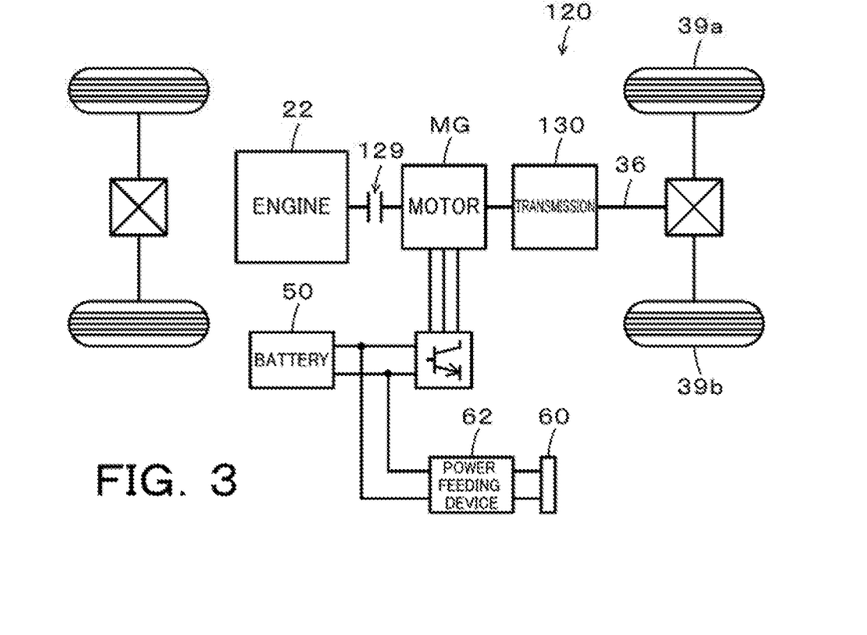
FIG. 3 is a configuration diagram illustrating the schematic configuration of another hybrid vehicle according to a modification.
Figure 4:
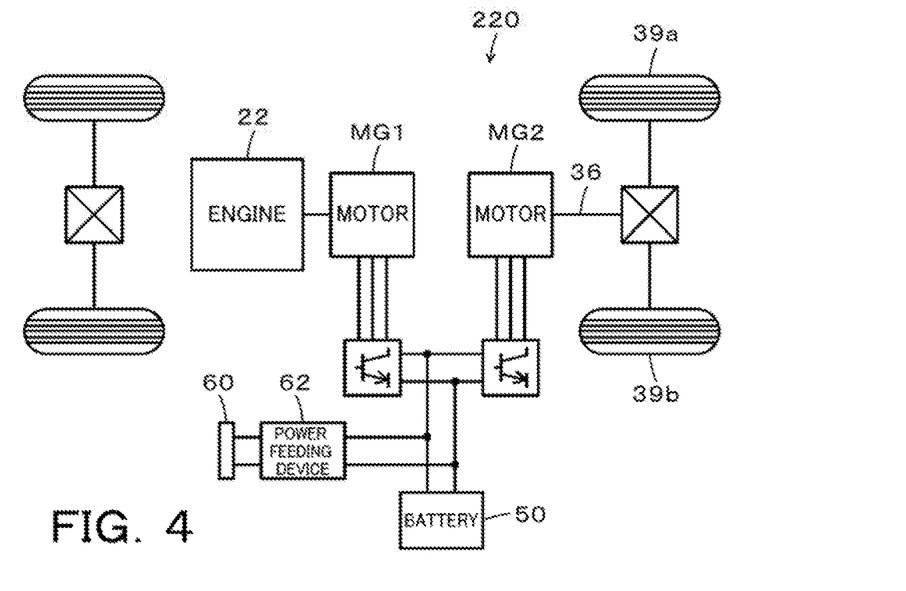
FIG. 4 is a configuration diagram illustrating the schematic configuration of another hybrid vehicle according to another modification.
Figure 5:
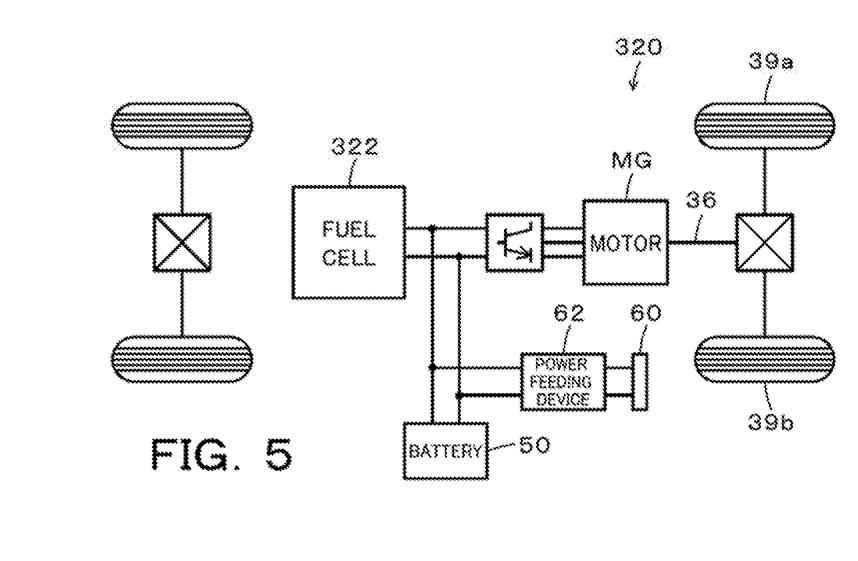
FIG. 5 is a configuration diagram illustrating the schematic configuration of a fuel cell vehicle according to another modification.

According to the embodiment, as shown in FIG. 1, the hybrid vehicle 20 is configured such that the engine 22 and the motor MG1 are connected via the planetary gear 30 with the driveshaft 36 that is linked with the drive wheels 39*a* and 39*b*, that the motor MG2 is connected with the driveshaft 36 and that the battery 50 is connected with the motors MG1 and MG2 via the power lines. The present disclosure may also be applied to a hybrid vehicle 120 configured such that a motor MG is connected via a transmission 130 with a driveshaft 36 that is linked with drive wheels 39*a* and 39*b*, that an engine 22 is connected with the motor MG via a clutch 129 and that a battery 50 is connected with the motor MG via power lines as shown in FIG. 3. The present disclosure may further be applied to a series hybrid vehicle 220 configured such that a motor MG2 is connected with a driveshaft 36 that is linked with drive wheels 39*a* and 39*b*, that a motor MG1 is connected with an engine 22, and that a battery 50 is connected with the motors MG1 and MG2 via power lines as shown in FIG. 4. The present disclosure may also be applied to a fuel cell vehicle 320 configured such that a motor MG is connected with a driveshaft 36 that is linked with drive wheels 39*a* and 39*b* and a fuel cell 322 and a battery 50 are connected with the motor MG via power lines as shown in FIG. 5.

In the vehicle according to the aspect of the present disclosure described above, the driving system may be configured to include an engine and a motor that is connected with an output shaft of the engine and that is connected with the power storage device via a power line. In this configuration, the driving system may also include a second motor for driving that is connected with the power line. The driving system may further include a planetary gear that is connected with the engine, the motor, a driveshaft linked with an axle, and the second motor. The driving system may also be configured to include a fuel cell that is connected with the power storage device via a power line and a motor for driving that is connected with the power line.

In the vehicle according to another aspect of the present disclosure described above, in a case where the vehicle is located in the area where the disaster occurs, the control device may perform the recommendation process when an evacuation is unrequired but does not perform the recommendation process when an evacuation is required. When an evacuation is unrequired and the user sets the charge priority mode, this configuration enables the vehicle to be sufficiently used as the power source for supplying the electric power to the external device. When an evacuation is required, on the other hand, this configuration suppresses the user from setting the charge priority mode and thereby suppresses the drivable distance from being shortened.

In this case, the control device may determine whether an evacuation is required or unrequired, based on disaster information and location information of the vehicle including altitude information. This configuration ensures appropriate determination of whether an evacuation is required or unrequired.

In the vehicle according to another aspect of the present disclosure described above, the recommendation process performed by the control device may display a message to recommend that the user sets the charge priority mode, on a display unit. This configuration enables the user to visually check the display unit and to determine whether the charge priority mode is to be set.

The following describes the correspondence relationship between the primary components of the embodiment and the primary components of the disclosure described in Summary. The engine 22, the planetary gear 30, the motors MG1 and MG2, the inverters 41 and 42 of the embodiment correspond to the "driving system", the battery 50 corresponds to the "power storage device", the power feeding device 62 corresponds to the "power feeding device", the HVECU 70 correspond to the "control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the vehicle and so on.

What is claimed is:
1. A vehicle, comprising:
a driving system including an engine and a motor, configured to generate electric power by using a fuel and output the generated electric power for driving the vehicle;
a battery configured to transmit electric power to and from the driving system;
a power feeding device configured to supply the generated electric power that is generated by the driving system and/or the electric power from the battery, to an external device; and
a hybrid electric control unit (HVECU) programmed to control the driving system and the power feeding device, wherein
the HVECU is programmed to:
determine if the vehicle is located in an area where a natural disaster occurs;
based upon the determination that the vehicle is located in the area where the natural disaster occurs, determine if an evacuation is unrequired;
based upon the determination that the evacuation is unrequired, recommend that a user sets a charge priority mode, which gives priority to charging of the battery over the driving system, and not recommend that the user sets the charge priority mode when an evacuation is required.
2. The vehicle according to claim 1,
wherein the HVECU determines the evacuation is unrequired, based on the following conditions being met:
a distance between where the natural disaster occurs and a position of the vehicle is greater than or equal to a reference distance, and
an altitude of the vehicle at the position of the vehicle is higher than or equal to a reference altitude.
3. The vehicle according to claim 2,
wherein the HVECU displays a message to recommend that the user sets the charge priority mode on a display unit.
4. The vehicle according to claim 1,
wherein the HVECU displays a message to recommend that the user sets the charge priority mode on a display unit.

* * * * *